(12) United States Patent
Sasaoka

(10) Patent No.: US 7,806,967 B2
(45) Date of Patent: Oct. 5, 2010

(54) FUEL CELL SEPARATOR, MANUFACTURING METHOD OF SAME, AND FUEL CELL AND VEHICLE USING THE SEPARATOR

(75) Inventor: Tomoharu Sasaoka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 867 days.

(21) Appl. No.: 10/577,953

(22) PCT Filed: Nov. 24, 2004

(86) PCT No.: PCT/IB2004/003843

§ 371 (c)(1),
(2), (4) Date: May 2, 2006

(87) PCT Pub. No.: WO2005/053069

PCT Pub. Date: Jun. 9, 2005

(65) Prior Publication Data

US 2007/0044661 A1    Mar. 1, 2007

(30) Foreign Application Priority Data

Nov. 25, 2003  (JP) ............................... 2003-394274

(51) Int. Cl.
- *B01D 53/22* (2006.01)
- *H01M 8/02* (2006.01)
- *H01M 2/14* (2006.01)

(52) U.S. Cl. .................... 96/4; 96/11; 95/45; 95/54; 95/55; 55/523; 55/DIG. 5; 429/34; 429/38; 428/458; 156/60; 156/73.1; 156/73.5; 156/73.6

(58) Field of Classification Search .................. 96/4, 96/11, 12; 95/45, 54, 55, 56; 55/523, DIG. 5; 429/34, 38; 156/60, 73.1, 73.5, 73.6; 428/458
See application file for complete search history.

(56) References Cited

U.S. PATENT DOCUMENTS

| | | |
|---|---|---|
| 5,268,241 A | 12/1993 | Meacham |
| 5,527,634 A | 6/1996 | Meacham et al. |
| 6,146,780 A | 11/2000 | Cisar et al. |
| 6,372,373 B1 | 4/2002 | Gyoten et al. |
| 6,638,657 B1 | 10/2003 | Cisar et al. |

(Continued)

FOREIGN PATENT DOCUMENTS

EP    0 951 086 A2    10/1999

(Continued)

OTHER PUBLICATIONS

Japanese Office Action, dated Oct. 22, 2009 for Japanese Application No. JP 2003-394274, with English Language translation.

*Primary Examiner*—Jason M Greene
(74) *Attorney, Agent, or Firm*—Oliff & Berridge, PLC

(57) ABSTRACT

A fuel cell separator is provided with a separator substrate made of metal which has at least one open portion through which a fluid can pass provided in a predetermined position, and a film coating member that coats a predetermined area including the open portion of the separator substrate. A portion of the film coating member that corresponds to at least a peripheral edge portion of the open portion is adhesion treated.

14 Claims, 9 Drawing Sheets

U.S. PATENT DOCUMENTS

| | | | |
|---|---|---|---|
| 7,112,287 B2 * | 9/2006 | Yagi et al. | 96/4 |
| 2003/0180598 A1 * | 9/2003 | Fischer et al. | 429/34 |
| 2004/0023095 A1 * | 2/2004 | Middelman et al. | 429/34 |
| 2004/0106032 A1 * | 6/2004 | Uejima et al. | 429/34 |

FOREIGN PATENT DOCUMENTS

| | | |
|---|---|---|
| EP | 1 489 675 A2 | 12/2004 |
| JP | A 02-139870 | 5/1990 |
| JP | 2001-057220 A | 2/2001 |
| JP | 2001-297777 A * | 10/2001 |
| JP | A 2002-025574 | 1/2002 |
| JP | 2003-109618 * | 4/2003 |
| JP | 2003-109618 A | 4/2003 |
| JP | A 2003-142119 | 5/2003 |
| JP | A 2003-151594 | 5/2003 |
| WO | WO 01/80339 A2 | 10/2001 |
| WO | WO 02/15311 A2 | 2/2002 |

* cited by examiner

CROSS-SECTION A-A

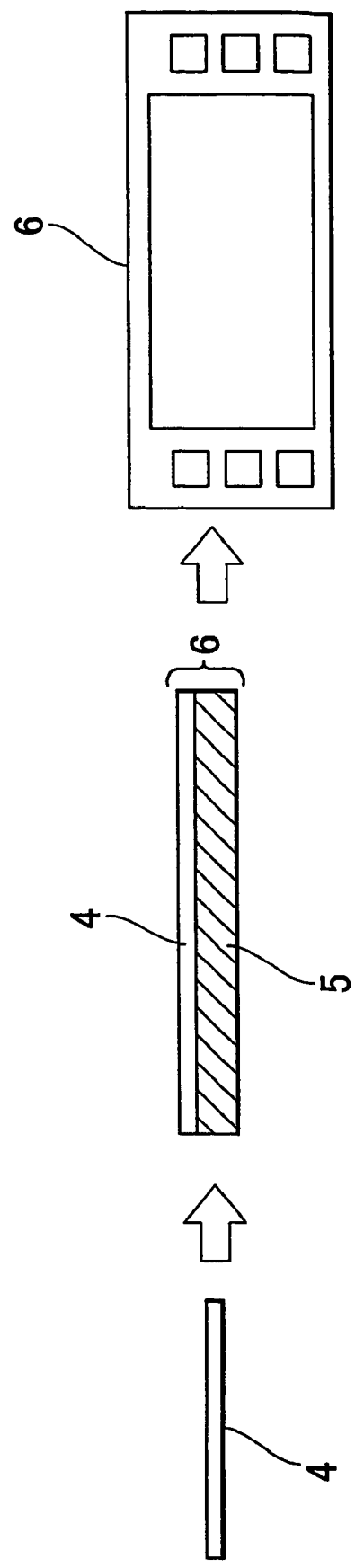

CROSS-SECTION A-A

CROSS-SECTION B-B

CROSS-SECTION B-B

FUEL CELL SEPARATOR, MANUFACTURING METHOD OF SAME, AND FUEL CELL AND VEHICLE USING THE SEPARATOR

BACKGROUND OF THE INVENTION

1. Field of the Invention

The invention relates to a fuel cell separator with good adhesion between a film and a substrate, which has excellent corrosion resistance against the corrosive atmosphere in a battery environment, and more particularly, excellent corrosion resistance of an open portion for forming a manifold. The invention also relates to a manufacturing method of the fuel cell separator, and a fuel cell and a vehicle which use the separator.

2. Description of the Related Art

Fuel cells are used in vehicles such as automobiles, as well as in other fields. These fuel cells have various kinds of fuel cell separators. Because the atmosphere in a battery environment is a corrosive one, attempts have been made to develop technology to improve the anticorrosive properties and the like of fuel cell separators.

For example, in attempt to provide a polymer electrolyte membrane fuel cell that can solve conventional problems like reduced performance of a fuel cell due to corrosion from contact with liquid within liquid gas, Japanese Patent Application Publication No. JP-A-2002-25574 proposes a polymer electrolyte membrane fuel cell made from sheet metal, in which is formed a manifold to allow fuel gas to flow into and out of a central fuel gas flow path, and in which a fluorocarbon resin coating layer is formed on an end surface of the manifold. This fuel cell separator is first sprayed with a fluorocarbon resin so that it coats an end surface of an opening for forming a manifold provided on a metal separator substrate, and then undergoes a punching process.

With a fuel cell made with this kind of fuel cell separator, however, despite the fact that the manifold has a coating layer on it, corrosion starts to occur at a peripheral edge portion that is not completely coated as fuel gas flows in and out. Also, this fuel cell separator requires many manufacturing processes due to the need for the spraying and punching processes. In addition, the punching process of the end surface of the opening of the manifold must be precisely controlled.

Furthermore, technologies for giving a fuel cell separator anticorrosive properties have also been proposed which coat a precious metal material onto a metal separator substrate using a PVD or CVD method, or which coat resin material or the like, including conductive material, onto an electrode side by spraying or the like.

These technologies, however, have the following problems. That is, (1) corrosion occurs starting at the peripheral edge portion (edge portion) of the manifold formed from the open portion of the fuel cell separator. This is because with current surface treatment technology it is difficult to coat portions such as the peripheral edge portion of the manifold perfectly. (2) Applying a precious metal coating may result in reduced adhesion of a seal portion when an adhesive, for example, is used for sealing, which may lead to a leak or the like, ultimately resulting in a loss of fuel cell function. This is because when gold, for example, is used as a precious metal coating material, there are generally almost no adhesives that adhere well to gold. (3) When all but the seal portion is coated with a precious metal coating in order to solve the problem described in (2) above, that seal portion remains susceptible to corrosion. This is because without the precious metal coating, the seal portion cannot withstand the battery environment.

SUMMARY OF THE INVENTION

It is an object of this invention to provide a fuel cell separator with good adhesion between a film and a substrate, which has excellent corrosion resistance against the corrosive atmosphere in a battery environment, and more particularly, excellent corrosion resistance of the open portion for forming the manifold. It is another object of this invention to provide a fuel cell that has excellent discharge resistance without leaking or the like, as well as a vehicle that has excellent performance such as durability and the like, which uses the fuel cell.

The present invention by the inventors through intense study achieves these objects with a fuel cell separator in which an open portion of a manifold through which is passed a fuel gas, air, or coolant or the like in the fuel cell is formed by a specific treatment using a film coating member that coats a separator substrate.

A first aspect of the invention relates to a fuel cell separator having a separator substrate made of metal which has at least one open portion through which a fluid can pass provided in a predetermined position; and a film coating member that coats a predetermined area including the open portion of the separator substrate, wherein a portion of the film coating member that corresponds to at least a peripheral edge portion of the open portion is adhesion treated. Here, the "peripheral edge portion" refers to the edge or near the edge of the open portion.

According to the first aspect of the invention, a fuel cell separator with good adhesion between the film and the substrate, which has excellent corrosion resistance against the corrosive atmosphere in a battery environment, and more particularly, excellent corrosion resistance of the open portion for forming the manifold, is able to be provided. This structure enables the corrosion resistance against the corrosive atmosphere in the battery environment, as well as the adhesion between the film and the substrate, to be improved.

In the first aspect of the invention, the separator substrate may be provided with a front surface and a back surface, a pair of the film coating members may be provided on the front surface and back surface, and the portion corresponding to at least the peripheral edge portion of the open portion in the pair of film coating members may be adhesion treated.

In the first aspect of the invention, the adhesion treatment may be at least one treatment selected from the group consisting of heat welding, high-frequency welding, ultrasonic welding, and adhesion by an adhesive. This structure enables the corrosion resistance against the corrosive atmosphere in the battery environment, as well as the adhesion between the film and the substrate, to be improved.

In the first aspect of the invention, the film coating member may be made from at least one material selected from the group consisting of resin material and elastomer material. This structure enables the corrosion resistance against the corrosive atmosphere in the battery environment, as well as the adhesion between the film and the substrate, to be improved.

In the first aspect of the invention, the separator substrate may be made from at least one material selected from the group consisting of SUS310, SUS304, SUS316, and titanium. This structure enables the corrosion resistance against the corrosive atmosphere in the battery environment, as well as the adhesion between the film and the substrate, to be improved.

In the first aspect of the invention, the separator substrate may be surface treated with at least one metal selected from the group consisting of gold and chrome. This structure enables the corrosion resistance against the corrosive atmosphere in the battery environment, as well as the adhesion between the film and the substrate, to be improved.

A second aspect of the invention relates to a manufacturing method of the fuel cell separator according to the above aforementioned first aspect, which includes the step of adhesion treating a portion of the film coating member that corresponds to at least a peripheral edge portion of the open portion.

According to the second aspect of the invention, it is possible to easily obtain a fuel cell separator with good adhesion between the film and the substrate, which has excellent corrosion resistance against the corrosive atmosphere in a battery environment, and more particularly, excellent corrosion resistance of the peripheral edge portion of the open portion of the manifold.

In the second aspect of the invention, the manufacturing method may include a thermo-compression bonding process in the adhesion treatment, in which a press temperature is 150 to 250° C., a press pressure is 20 to 200 kgf/cm$^2$, and a press time is 0.2 to 20 minutes. Accordingly, it is possible to easily obtain a fuel cell separator with improved corrosion resistance and adhesion between the film and substrate.

A third aspect of the invention relates to a fuel cell which has a plurality of the fuel cell separators according to any one of the first aspect and modifications thereof.

According to the third aspect of the invention, a fuel cell is provided which has excellent performance as a fuel cell, such as discharge resistance, without leaking or the like.

A fourth aspect of the invention relates to a vehicle which has the fuel cell according to the third aspect of the invention.

According to the fourth aspect of invention, it is possible to provide a vehicle such as a fuel cell vehicle which has excellent performance such as durability.

This invention makes it possible to provide a fuel cell separator with good adhesion between the film and the substrate, which has excellent corrosion resistance against the corrosive atmosphere in a battery environment, and more particularly, excellent corrosion resistance of the open portion for forming the manifold. This invention also makes it possible to provide a fuel cell separator manufacturing method by which the superior fuel cell separator can easily be obtained. Further, the invention makes it possible to provide a fuel cell with excellent discharge resistance without leaking or the like. Still further, the invention makes it possible to provide a vehicle such as a fuel cell vehicle having exceptional performance such as durability.

BRIEF DESCRIPTION OF THE DRAWINGS

FIGS. 7A and 7B are sectional views showing the film and the joined body of the film and an elastic body, respectively, used in a manufacturing method according to a second exemplary embodiment of the invention, while FIG. 7C is a plan view of the joined body after it has been made into a predetermined shape;

DETAILED DESCRIPTION OF THE PREFERRED EMBODIMENTS

In the following description and the accompanying drawings, the present invention will be described in more detail in terms of exemplary embodiments. It should be noted, however, that the invention is not limited in any way to these exemplary embodiments.

(Fuel Cell Separator)

Figure 1:
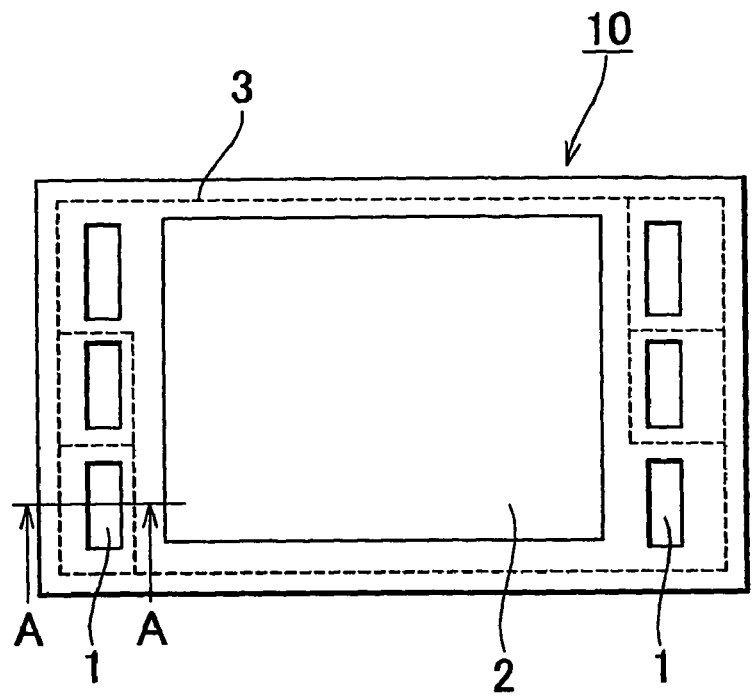
FIG. 1 is a plan view schematically showing a fuel cell separator according to a first exemplary embodiment of the invention.

A fuel cell separator 10 shown in FIG. 1 can be given as one exemplary embodiment of the fuel cell separator according to the invention. The fuel cell separator 10 according to this exemplary embodiment is provided with a metal separator substrate 2 that has at least one open portion 1 through which a fluid such as a fuel gas, air, or coolant can pass provided in a predetermined location, and a pair of film coating members 3 that coat a predetermined area including the open portion 1 in the substrate 2, as shown in FIG. 1. On the fuel cell separator 10, a portion corresponding to at least a peripheral edge portion of the open portion 1 on the pair of film coating members 3 is adhesion treated.

In this exemplary embodiment, a total of six (i.e., three on the left side and three on the right side when viewed from above) rectangular open portions 1 are provided, as shown in FIG. 1. The open portions 1 form a manifold to enable a fluid such as fuel gas, air, or coolant to pass through when used as a fuel cell. It is necessary that these open portions 1 have corrosion resistance because they are exposed to a battery environment, which has an extremely corrosive atmosphere.

In the open portions 1 in this exemplary embodiment, the portions corresponding to the peripheral edge portions of the open portions 1 of the pair of film coating members 3 are adhesion treated, as described above, so they have excellent corrosion resistance with respect to the corrosive atmosphere in the battery environment (hereinafter, also simply referred to as "corrosion resistance").

Figure 16:
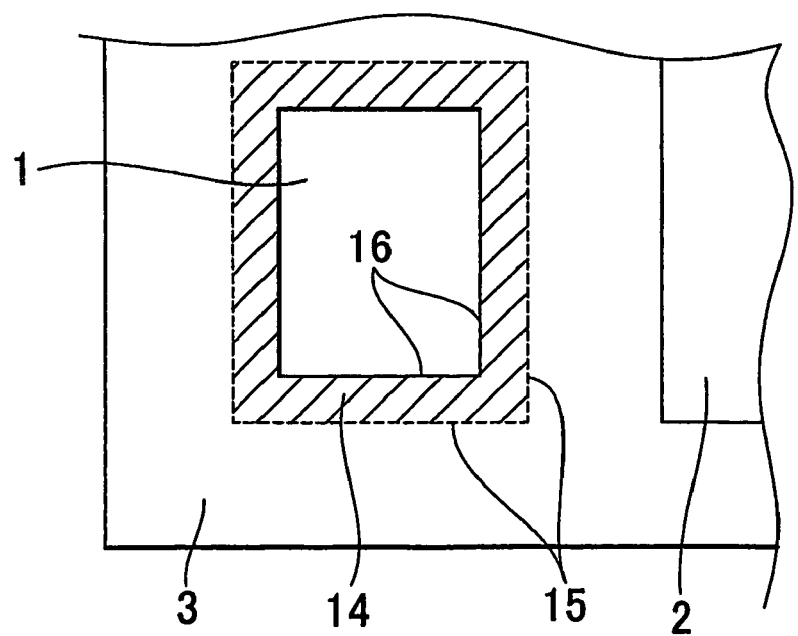
FIG. 16 is a partially expanded (plan) view of the fuel cell separator shown in FIG. 1, which shows the adhesion treated portion of the film coating member that corresponds to the peripheral edge portion of the open portion.

Here, the area of the peripheral edge portion 14 where the film coating member 3 is adhesion treated is (the hatched area) from an edge 15 (end surface) of the open portion 1 to an edge 16 of the film coating member 3, as shown in FIG. 16. The portion (area) that is adhesion treated may be either a portion or all of the peripheral edge portion 14, selected as appropriate, so long as the effect of the invention is not lost.

FIG. 16 is a partially expanded (plan) view of the fuel cell separator 10 shown in FIG. 1, which shows the adhesion treated portion (i.e., the hatched portion) of the film coating member that corresponds to the peripheral edge portion of the open portion 1. Also, the center portion of the fuel cell separator 10 shown in FIG. 1 where the separator substrate 2 is exposed, i.e., not covered by the film coating member 3, is a power generating portion. The broken line indicates a seal portion that joins the separator substrate 2 and the film coating member 3 together.

Here, the adhesion treatment, i.e., the adhesion treatment for joining the separator substrate 2 and the pair of film coating members 3, is not particularly limited as long as the corrosion resistance and the adhesion between the separator substrate 2 and the film coating member 3 (hereinafter, also simply referred to as "adhesion") is not lost, but is preferably at least one a treatment selected from the group of adhesion by heat welding, high-frequency welding, ultrasonic welding, and an adhesive (or primer), for example.

The separator substrate 2 is a substrate that is made of metal in generally the same shape as the fuel cell separator 10 of this exemplary embodiment that it forms. The separator substrate 2 has open portions 1 in positions corresponding to the open portions 1 of the fuel cell separator 10, i.e., three on the left side and three on the right side when viewed from above.

The material of the separator substrate 2 is not particularly limited, but is preferably one or more kinds of material selected from the group of SUS310, SUS304, SUS316, and titanium, for example.

Also, the separator substrate 2 is preferably surface treated with a metal of gold or chrome (e.g., coated with a precious metal). There are also cases in which the metal surface treatment is not applied in order to improve the adhesion strength between the separator substrate 2 and the film coating member 3 (i.e., the seal portion).

Figure 2:
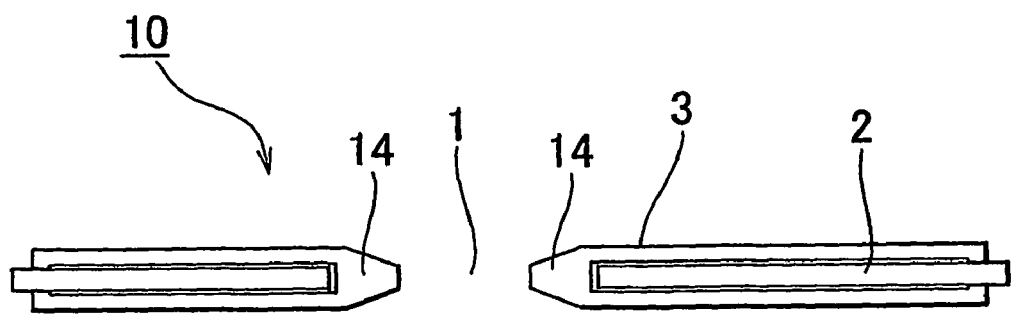
FIG. 2 is a sectional view of the fuel cell separator in FIG. 1, taken along line A-A in FIG. 1.

A predetermined area of the separator substrate 2, or more specifically, an area that includes a portion (a portion near the open portion 1) of both surfaces of the separator substrate 2 and the end surface (i.e., edge portion) of the open portion 1, as shown in FIG. 1, is coated with the pair of film coating members 3 so that at least the edge and the entire area near the edge of the substrate 2 is coated. The portion of the pair of film coating members 3 that corresponds to at least the peripheral edge portion of the open portion 1 is adhesion treated. At this time, the separator substrate 2 is laminated by the film coating members 3, as shown in FIG. 2.

In the fuel cell separator 10 according to this exemplary embodiment, the edge and the area close to the edge of the open portion 1 is in this way covered by the adhesion treated portion of the film coating member 3 that corresponds to at least the peripheral edge portion of the open portion 1. Therefore, the edge and the area around the edge of the separator substrate 2 are able to be shielded from the corrosive environment. As a result, corrosion will not start to occur at the peripheral edge portion. In addition, laminating the seal portion improves adhesion more so than does welding it to a precious metal.

The material of the film coating member 3 is not particularly limited, but is preferably at least one of resin material and elastomeric material, for example. More specific examples are a resin such as an olefin resin, a fluorocarbon resin, or an amide resin, and an elastomer such as an olefin elastomer, a fluorocarbon elastomer, or an amide elastomer.

Also, the film coating material 3 preferably has excellent environmental resistance properties. Examples include a material that does not change in an acidic atmosphere of pH 2 or higher, a material that does not have a glass transition point between −30 and 120° C., and a material that does not change with an electric potential of 1.5V or less.

Preferred examples of a material that has these kinds of environmental resistance properties are ethylene tetrafluoroethylene (ETEF), ethylene tetrafluoroethylene hexafluoride propylene copolymer (EFEP), polyvinyl fluoride (PVF), polyphenylene sulfide (PPS), and polypropylene (PP). EFEP is used in this exemplary embodiment.

Moreover, the film coating member 3 can preferably have a thickness of 10 to 200 μm.

Next, various examples of the fuel cell separator of the invention will be described with reference to the drawings. Examples include a film welded type fuel cell separator and an adhered type fuel cell separator. FIGS. 3 to 6 are sectional views (figures corresponding to the cross-section taken along line A-A in FIG. 1) showing two arbitrary fuel cell separators from among the plurality of fuel cell separators in a fuel cell stack.

(1) Film Welded Type

Figure 3:
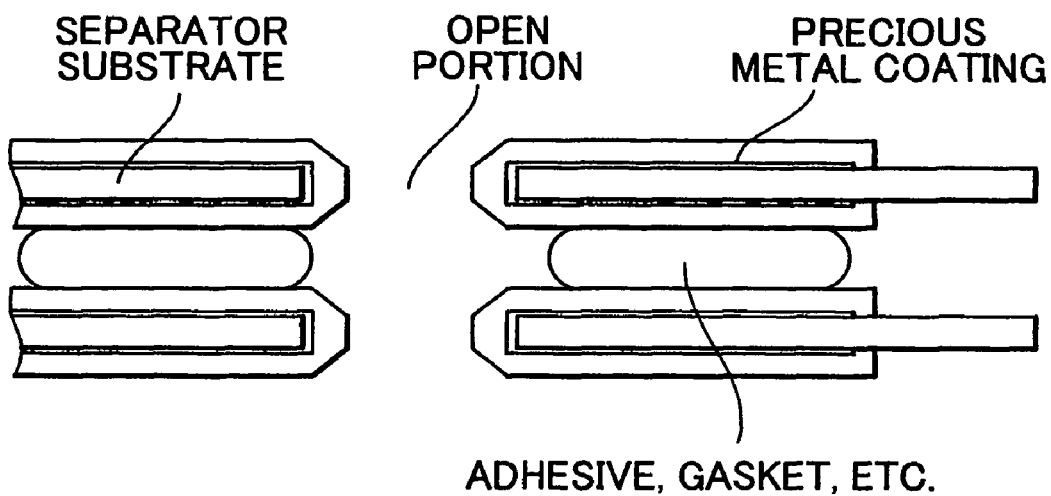
FIG. 3 is a view (schematic sectional view) showing an example using film welding on the fuel cell separator (a laminated type fuel cell separator with a precious metal coating) of this invention.
Figure 4:
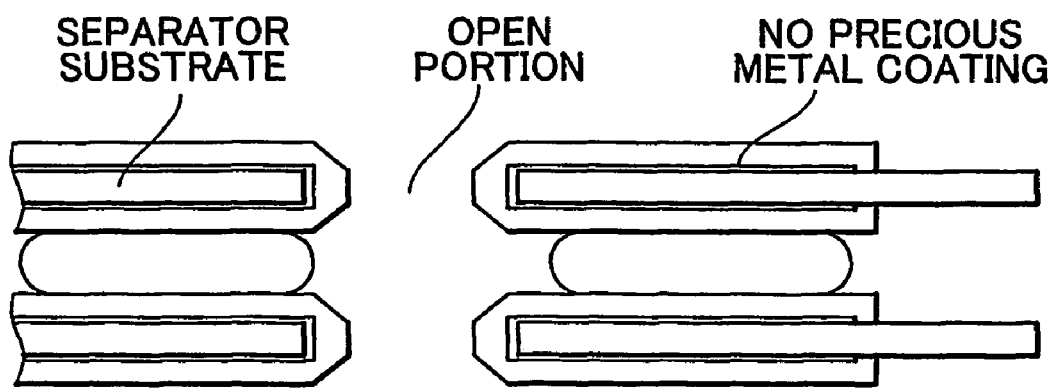
FIG. 4 is a view (schematic sectional view) showing an example using film welding on the fuel cell separator (a laminated type fuel cell separator without a precious metal coating) of this invention.

Examples of the film welded type are a laminated type fuel cell separator with a precious metal coating, shown in FIG. 3, and a laminated type fuel cell separator without a precious metal coating, shown in FIG. 4.

With the laminated type fuel cell separator with a precious metal coating shown in FIG. 3, the separator substrate is coated with a precious metal, and a predetermined portion, including the edge of the open portion of the separator substrate that was coated with the precious metal, is laminated to the pair of films corresponding to the front and back surfaces of the substrate. The portion of the pair of films that corresponds to the peripheral edge portion of the open portion then undergoes welding treatment.

Two adjacent fuel cell separators are then joined via a separator module such as an adhesive or a gasket. Using a fuel cell separator of this structure improves the anticorrosive effect of the peripheral edge around the open portion, as well as improves the adhesion strength between films and also the adhesion strength between the film and the separator module.

Also, with the laminated type fuel cell separator without the precious metal, shown in FIG. 4, a predetermined portion, including the edge of the open portion of the separator substrate, is laminated to the pair of films corresponding to the front and back surfaces of the substrate without the separator substrate being coated with a precious metal as it was in the description above. The portion of the pair of films that corresponds to the peripheral edge portion of the open portion then undergoes welding treatment.

Two adjacent fuel cell separators are then joined via a separator module such as an adhesive or a gasket. Using a fuel cell separator of this structure improves the anticorrosive effect of the peripheral edge around the open portion (the corrosion resistance of the portion that is not coated also improves due to the lamination), as well as improves the adhesion strength between films and also the adhesion strength between the film and the separator module.

(2) Adhesion Type

Figure 5:
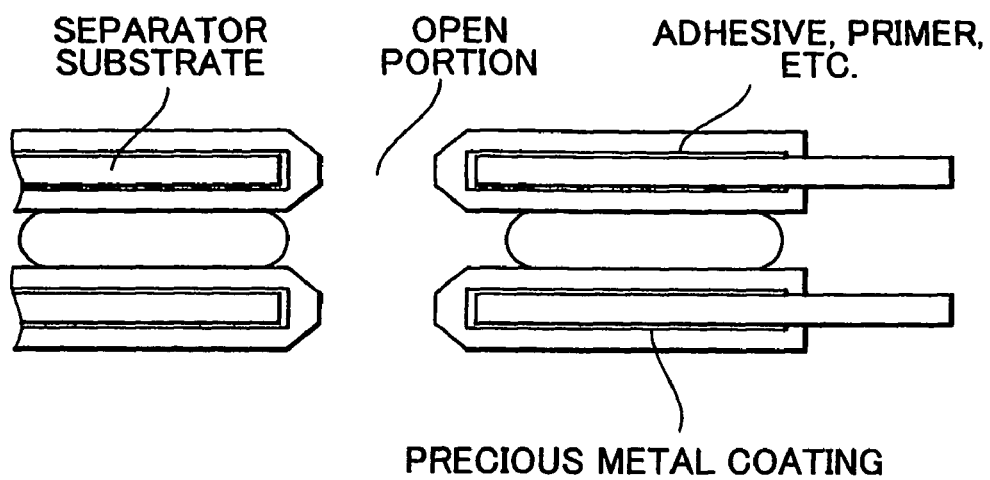
FIG. 5 is a view (schematic sectional view) showing an example using adhesion on the fuel cell separator (a laminated type fuel cell separator with a precious metal coating) of this invention.
Figure 6:
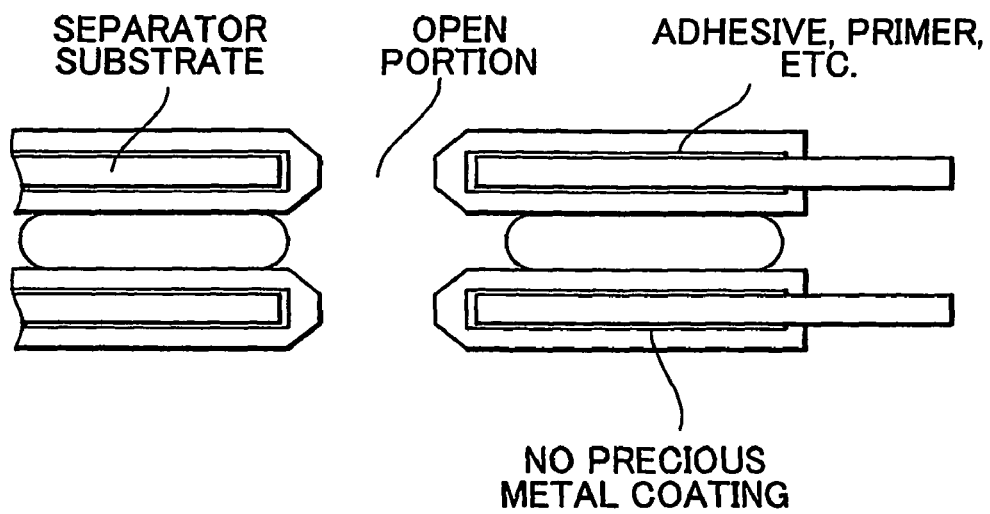
FIG. 6 is a view (schematic sectional view) showing an example using adhesion on the fuel cell separator (a laminated type fuel cell separator without a precious metal coating) of this invention.

Examples of the adhesion type are a laminated type fuel cell separator with a precious metal coating, shown in FIG. 5, and a laminated type fuel cell separator without a precious metal coating, shown in FIG. 6.

With the laminated type fuel cell separator with a precious metal coating shown in FIG. 5, the portion of the pair of films that corresponds to the peripheral edge portion of the open portion is adhesion treated by coating the separator substrate with a precious metal and laminating a predetermined portion, including the edge of the open portion of the separator substrate that was coated with the precious metal, to the pair of films corresponding to the front and back surfaces of the substrate via an adhesive or a primer.

Two adjacent fuel cell separators are then joined via a separator module such as an adhesive or a gasket. Using a fuel cell separator of this structure improves the anticorrosive effect of the peripheral edge around the open portion, as well as improves the adhesion strength between films and also the adhesion strength between the film and the separator module.

Also, with the laminated type fuel cell separator without the precious metal, shown in FIG. 6, the portion of the pair of films that corresponds to the peripheral edge portion of the open portion undergoes welding treatment by similarly laminating a predetermined portion, including the edge of the open portion of the separator substrate, to the pair of films corresponding to the front and back surfaces of the substrate via a adhesive or primer without the separator substrate being coated with a precious metal as it was in the above description.

Two adjacent fuel cell separators are then joined via a separator module such as an adhesive or a gasket. Using a fuel cell separator of this structure improves the anticorrosive effect of the peripheral edge around the open portion (the corrosion resistance of the portion that is not coated also improves due to the lamination), as well as improves the adhesion strength between films and also the adhesion strength between the film and the separator module.

(Manufacturing Method of the Fuel Cell Separator)

Next, a manufacturing method of the fuel cell separator according to the invention will be described.

A manufacturing method according to a second exemplary embodiment of the invention is a preferable method for manufacturing the fuel cell separator described above, and is characterized in that it includes at least a thermo-compression bonding process. It should be noted that the fuel cell separator described above is not particularly limited to this manufacturing method. Manufacturing by various adhesion methods, such as thermo-compression bonding, adhesion, and high-frequency welding are possible as adhesion treatment for adhering the portion of the pair of film coating members that corresponds to the peripheral edge portion of the open portion. When the adhesion method is used, the adhesive is applied between the separator substrate and the film coating members such that the adhesive is disposed between both film coating members. A method such as screen printing may be used, for example.

This exemplary embodiment includes at least a thermo-compression bonding process that applies the thermo-compression bonding treatment. The thermo-compression bonding is preferable done by laminating.

Preferable conditions in the thermo-compression bonding process are that the press temperature be 150 to 250° C., that the press pressure be 20 to 200 kgf/cm$^2$, and that the press time be 0.2 to 20 minutes.

An example in which the fuel cell separator 10 according to the first exemplary embodiment is manufactured according to the manufacturing method of this exemplary embodiment will now be described. In the manufacturing method according to this second exemplary embodiment, members that are the same as members used in the fuel cell separator in the first exemplary embodiment described above will be referred to by the same reference numerals. First, the pair of film coating members 3 corresponding to the shape of the fuel cell separator 10 to be formed are prepared.

In this exemplary embodiment, for the film coating members 3 an elastic body such as silicone rubber that has been integrally joined with a sheet-like material as a manufacturing model before the film is shaped is preferably used because it has rigidity prior to lamination due to electrostatic force and the like, and is therefore easy to handle.

That is, as shown in FIGS. 7A to 7C, a film 4 (sheet-like material) serving as the manufacturing model for the film coating members 3 is thin and flexible, not rigid, which makes it in itself difficult to handle (FIG. 7A). Therefore, an elastic body 5 that is detachable after lamination is temporarily joined to the film 4 by static electricity or the like (FIG. 7B). At this time, the joining is performed in a vacuum or using rollers or the like such that, to the greatest extent possible, air is prevented from entering between the film 4 and the elastic body 5. This kind of joining of the elastic body 5 to the film 4 solves the conventional problem of difficulty in controlling the film such as when positioning it on the surface of the separator substrate 2 due to a lack of rigidity, which comes from the film 4 itself having a thickness of only approximately 0.05 to 0.2 mm.

The joined body 6, which is a combination of the film 4 and the elastic body 5, is then made into the predetermined shape of the film coating member 3 (FIG. 7C) using a punch cutter or the like.

FIG. 7A is a sectional view of the film 4 and FIG. 7B is a sectional view of the joined body 6. FIG. 7C is a plan view of the joined body 6 after it has been made into the predetermined shape.

Next, two of the joined bodies 6 (FIG. 8A) made of the film 4 and the elastic body 5, which have been made into a predetermined shape having positioning pin holes 7 and air escape holes 8, together with the metal separator substrate 2 (FIG. 8B) having the predetermined open portions 1 are prepared, and the pair of joined bodies 6 are set on both side surfaces of the separator substrate 2. At this time, the surface of the film 4 of the joined body 6 is set on (joined with) the separator substrate 2 and the two are affixed together, as shown in FIG. 9.

When they are set, the position of the joined body 6 that joins with the separator substrate 2 is determined by a positioning pin 9. Here, any of various methods may be used for the positioning method. Examples include methods I and II using positioning pins and a positioning method by providing a depression in the mold. These methods are described as follows.

(1) Method I using Positioning Pins

Figure 8A:
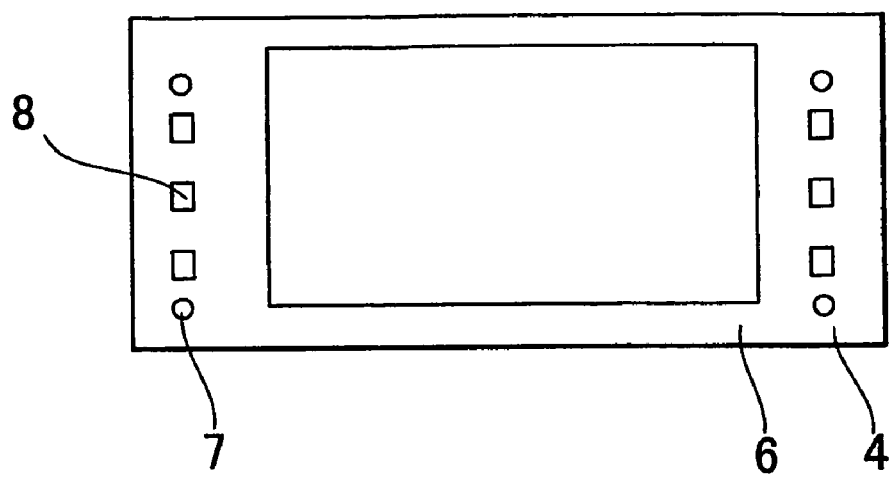
FIG. 8A is a plan view of the joined body used in the manufacturing method according to the second exemplary embodiment of the invention.
Figure 8B:
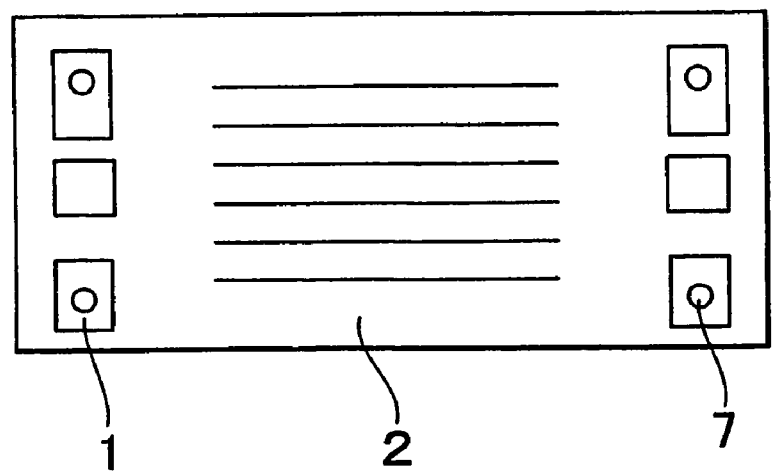
FIG. 8B is a plan view of the separator substrate used in the same embodiment.
Figure 9:
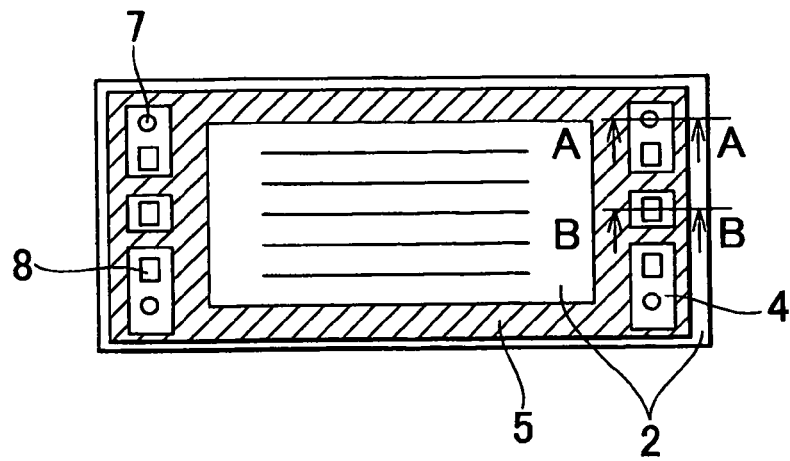
FIG. 9 is a plan view showing the pair of joined bodies set on the separator substrate.
Figure 10:
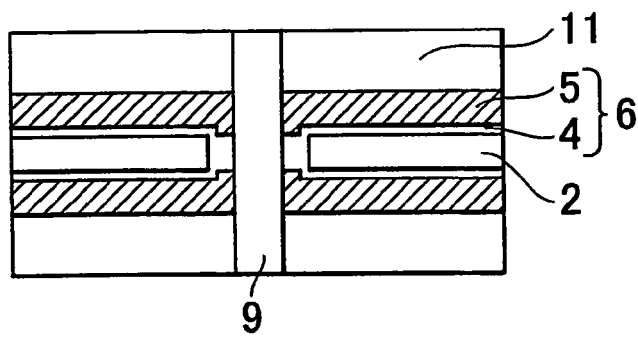
FIG. 10 is a sectional view taken along line A-A showing both the state in which the joined bodies and the separator substrate in FIG. 9 are set, and a manufacturing mold and a positioning pin.

According to this method, a positioning hole 7 is provided at the open portion that forms the manifold, or in a location where the manifold is formed, in the pair of joined bodies 6 and the separator substrate 2, as shown in FIGS. 8A and 8B. Then when these are set as shown in FIG. 9, positioning is done using the pin 9 in the positioning hole 7 and the like, as shown in FIG. 10. FIG. 10 is a sectional view taken along line A-A showing both the state in which the joined bodies 6 and the separator substrate 2 in FIG. 9 are set and a manufacturing mold 11 and the positioning pin 9.

Figure 11:
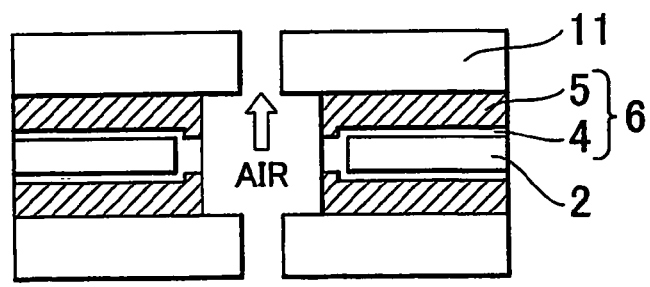
FIG. 11 is a sectional view taken along line B-B showing both the state in which the joined bodies and the separator substrate in FIG. 9 are set, and the manufacturing mold.

Also, air escape holes 8 are provided in advance at predetermined locations in the joined bodies 6 and the mold 11. As a result, during manufacturing, the joining bodies 6 and the mold 11 are in a state such as that shown in FIG. 11, thereby making it possible to effectively prevent air from remaining between the joining bodies 6 and the mold 11. FIG. 11 is a sectional view taken along line B-B showing both the state in which the joined bodies 6 and the separator substrate 2 in FIG. 9 are set, and the manufacturing mold 11. In method I using the positioning pins, punching is necessary.

(2) Method II using Positioning Pins

Figure 12A:
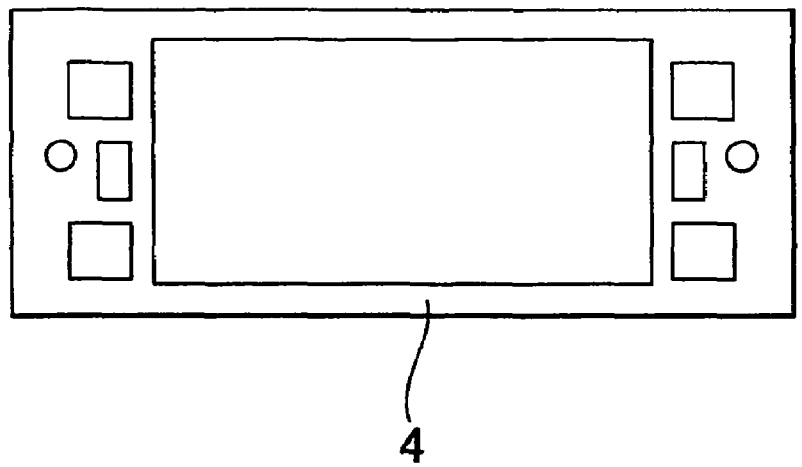
FIGS. 12A and 12B are views for explaining a method II using positioning pins.
Figure 12B:
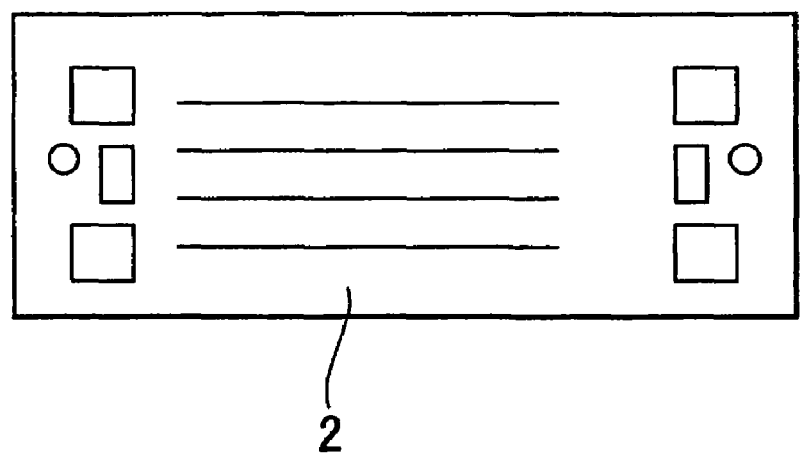

In this method, as shown in FIGS. 12A and 12B, the positioning holes 7 are formed in locations other than the open portions of the joined body 6 and the mold 11. Positioning is done using the pins 9 and the like, just as in method I described above. In method II using the positioning pins, punching is not necessary.

(3) Positioning Method using a Depression on the Inside of the Mold

Figure 13:
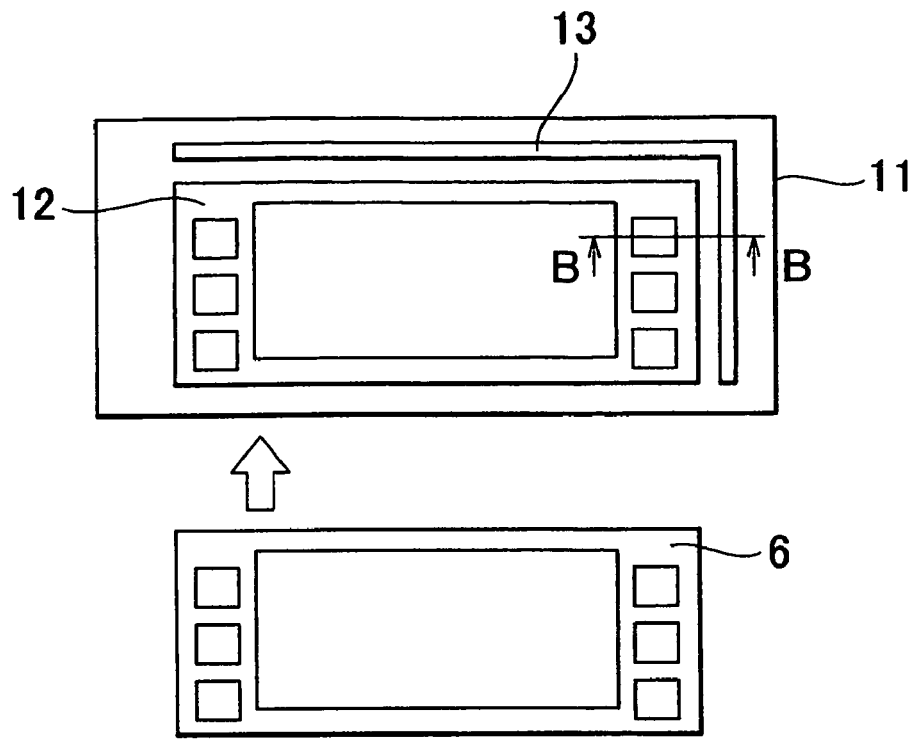
FIG. 13 is a view illustrating how the joined body of the film and the elastic body fits into the lower mold.

With this method, positioning is done by providing a depression for the joined body 6, which is formed of the film 4 and the elastic body 5, in the mold 11 used for manufacturing. More specifically, as shown in FIG. 13, a depression 12 in the shape of the joined body 6 is provided in the surface of the lower mold 11. The joined body 6 is then placed in the depression 12 so that the film 4 faces the surface. A depression 12 just like that provided in the lower mold 11 is also provided in the upper mold 11, and the joined body 6 is placed therein in the same manner.

Here, an angled columnar positioning block 13 for adjusting the position of the separator substrate 2 is provided on two adjacent sides of the lower mold 11, to the outside of the depression 12 in the surface of the lower mold 11. Moreover, a groove 14 into which the positioning block 13 can fit is provided on the surface in which the depression 12 is formed of the upper mold 11.

Figure 14:
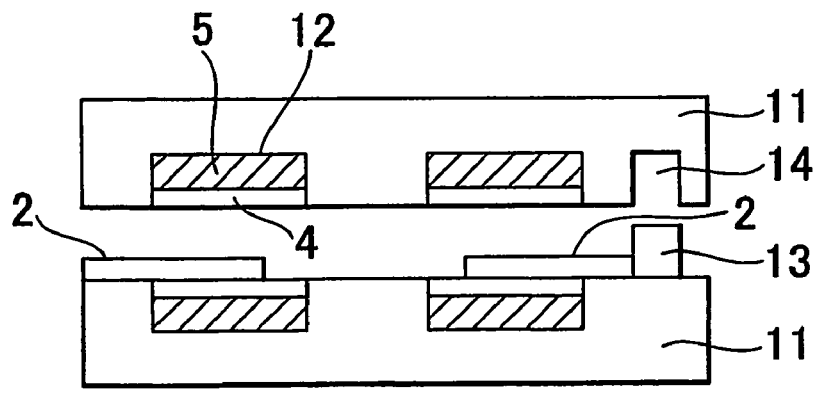
FIG. 14 is a sectional view taken along line B-B of FIG. 13 showing the lower mold in FIG. 13 together with the pair of joined bodies, the separator substrate, and the upper mold.

Then, just as shown in FIG. 14, the separator substrate 2 is positioned by placing it flush against the positioning block 13 on the lower mold 11 into which the joined body 6 of the film 4 and the elastic body 5 has been inserted. Then, the upper mold 11 into which the other joined body 6 of the film 4 and the elastic body 5 has been inserted is fit together with the lower mold 11 into which the separator substrate 2 has been placed in the predetermined position. FIG. 13 is a view illustrating how the joined body 6 of the film 4 and the elastic body 5 fits into the lower mold 11. FIG. 14 is a sectional view taken along line B-B of FIG. 13 showing the lower mold 11 together with the pair of joined bodies 6, the separator substrate 2, and the upper mold 11. In this positioning method using the depression on the inside of the mold, punching is not necessary.

After the upper and lower molds 11 have been fitted together, pressure is applied from both the top and bottom of the mold 11 so that the portion of the pair of films 4 (joined bodies 6) corresponding to at least the peripheral edge portion of the open portion 1 is thermo-compression bonded. The thermo-compression bonding at this time is performed within the preferred ranges of the conditions described above. After that, the elastic body 5, which is no longer necessary, is detached. In this way, the fuel cell separator 10 according to the exemplary embodiment is able to be obtained.

TEST EXAMPLE 1

Figure 15:
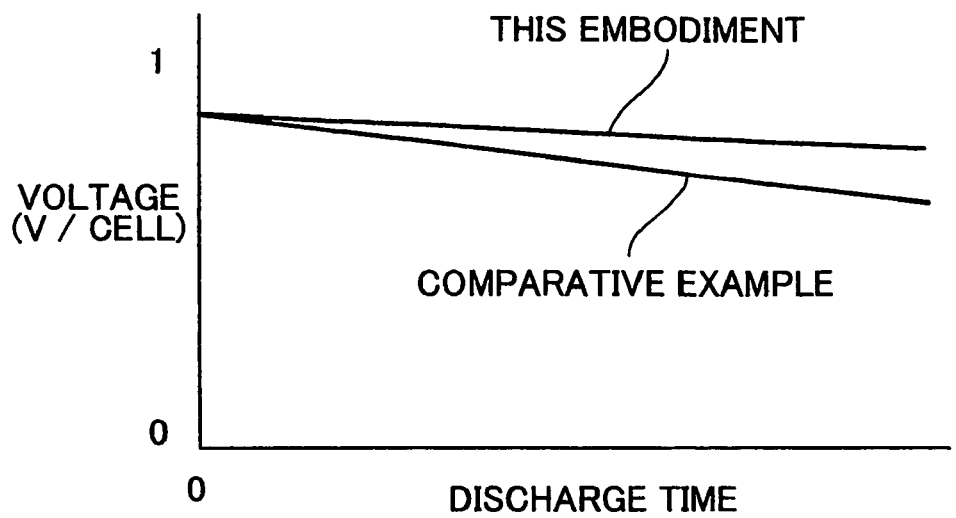
FIG. 15 is a graph showing the relationship between the voltage and the discharge time of the fuel cell using the fuel cell separator according to the exemplary embodiment compared to a conventional example.

A fuel cell using a plurality of the fuel cell separators 10 according to the exemplary embodiment (i.e., the invention) in a stack and a fuel cell using a plurality of conventional fuel cell separators, as a comparative example, were both charged (1V). Upon measuring the voltage during discharge (V/cell) over time, the results shown in the graph in FIG. 15 were obtained. As a result, it is apparent that the fuel cell separators of this invention enable a fuel cell with discharge resistance to be obtained.

Furthermore, in the invention, excellent discharge resistance without leaking or the like is able to be obtained by a fuel cell provided with a plurality of the fuel cell separators according to the foregoing exemplary embodiment.

Furthermore, excellent performance, such as durability, is able to be obtained by a vehicle provided with at least a fuel cell according to the foregoing exemplary embodiment.

Although the invention has been described herein with reference to specific embodiments, it is not limited to these embodiments. On the contrary, many modifications and variations therein are included within the intended scope of the invention.

In the foregoing exemplary embodiment, the portion of the pair of film coating members 3 that corresponds to the peripheral edge portion of the open portion 1 is adhesion treated. The predetermined portion to be adhesion treated, however, may also be a portion corresponding to the peripheral edge portion of the open portion 1, together with an entire portion corresponding to a peripheral edge portion covering another edge of the separator substrate 2 other than that of the open portion 1. That is, the adhesion treatment according to this exemplary embodiment can not only be applied to the open portion 1 of the separator substrate 2, but also to a peripheral edge portion of another portion.

This invention has industrial applicability as i) a fuel cell separator with good adhesion between a film and a substrate, which has excellent corrosion resistance against the corrosive atmosphere in a battery environment, and more particularly, excellent corrosion resistance of the open portion for forming the manifold, ii) a manufacturing method of that fuel cell separator, and iii) a fuel cell and vehicle which use the separator.

The invention claimed is:

1. A fuel cell separator comprising:
    a separator substrate made of metal which has at least one open portion that passes through the separator substrate through which a fluid can pass provided in a predetermined position; and
    a film coating member that coats at least a peripheral edge portion and an inner circumference portion of the open portion of the separator substrate, wherein the film coating member adheres to at least a portion of the separator substrate and wherein the film coating member is adhered to by at least one treatment selected from the group consisting of heat welding, high-frequency welding, ultrasonic welding, and adhesion by an adhesive.

2. The fuel cell separator according to claim 1, wherein the separator substrate is provided with a front surface and a back surface, a pair of the film coating members are provided on the front and back surfaces, and the pair of the film coating members adheres to a portion of the separator corresponding to at least a peripheral edge portion of the open portion.

3. The fuel cell separator according to claim 1, wherein the film coating member is made from at least one material selected from the group consisting of resin material and elastomer material.

4. The fuel cell separator according to claim 1, wherein the separator substrate is made from one or more materials selected from the group consisting of SUS310, SUS304, SUS316, and titanium.

5. The fuel cell separator according to claim 1, wherein the separator substrate is surface treated with at least one metal selected from the group consisting of gold and chrome.

6. A manufacturing method of the fuel cell separator according to claim 1, comprising:
   adhering the film coating member to a portion of the separator substrate by at least one treatment selected from the group consisting of heat welding, high-frequency welding, ultrasonic welding, and adhesion by an adhesive so as to coat at least the peripheral edge portion and the inner circumference portion of the open portion of the separator substrate.

7. A manufacturing method of a fuel cell separator comprising:
   adhering a film coating member to at least a portion of a separator substrate by a thermo-compression process in which a press temperature is 150 to 250° C., a press pressure is 20 to 200 kgf/cm$^2$, and a press time is 0.2 to 20 minutes,
   wherein the separator substrate is made of metal and has at least one open portion that passes through the separator substrate through which a fluid can pass provided in a predetermined position, and wherein the film coating member coats at least a peripheral edge portion and an inner circumference portion of the open portion of the separator substrate.

8. A fuel cell comprising:
   a plurality of the fuel cell separators according to claim 1.

9. A vehicle comprising:
   the fuel cell according to claim 8.

10. The fuel cell separator according to claim 1, wherein the film coating member adheres to a portion of the separator corresponding to at least a peripheral edge portion of the open portion.

11. The fuel cell separator according to claim 10, wherein the film coating member adheres to the peripheral edge portion of the open portion.

12. The fuel cell separator according to claim 2, wherein the pair of the film coating members adheres to at least the peripheral edge portion of the open portion.

13. The manufacturing method according to claim 6, wherein the film coating member is adhered to a portion of the separator substrate corresponding to at least a peripheral edge portion of the open portion.

14. The manufacturing method according to claim 13, wherein the film coating member is adhered to the peripheral edge portion of the open portion.

* * * * *